United States Patent Office 3,301,589
Patented Jan. 31, 1967

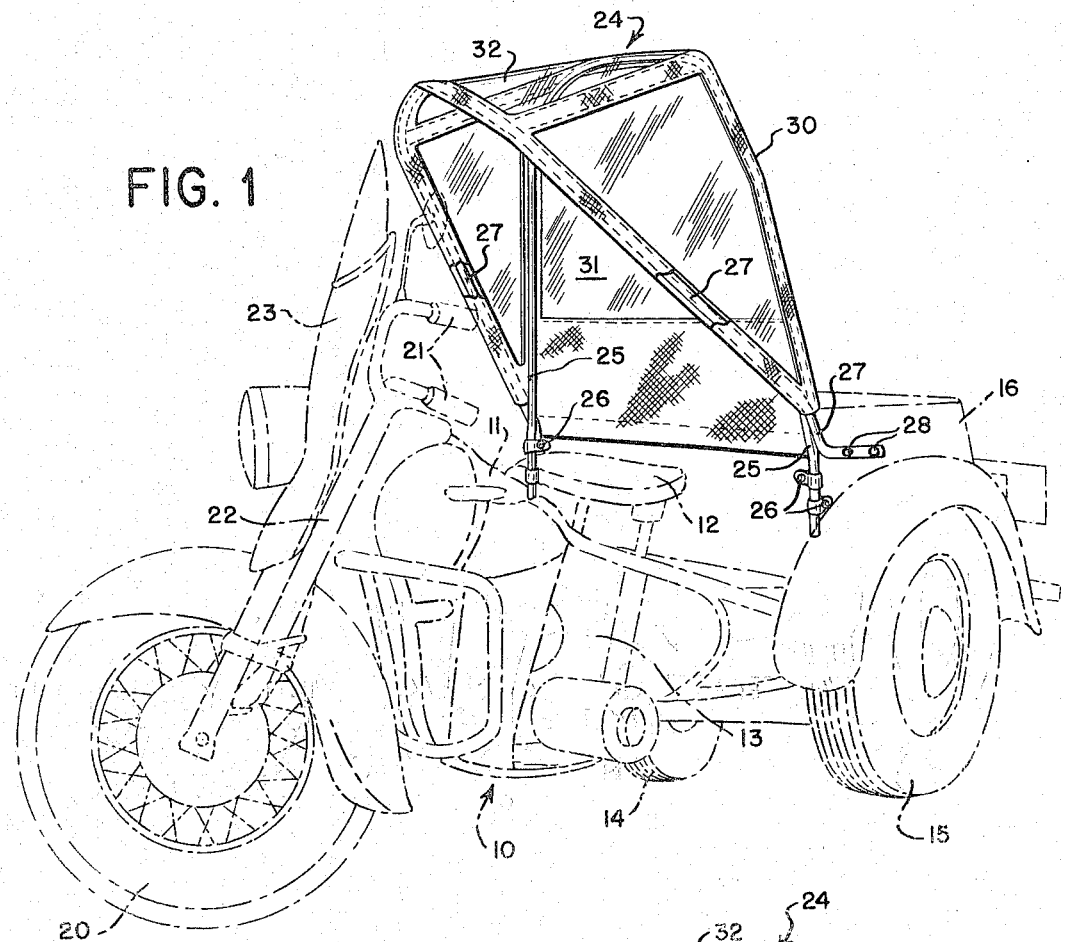
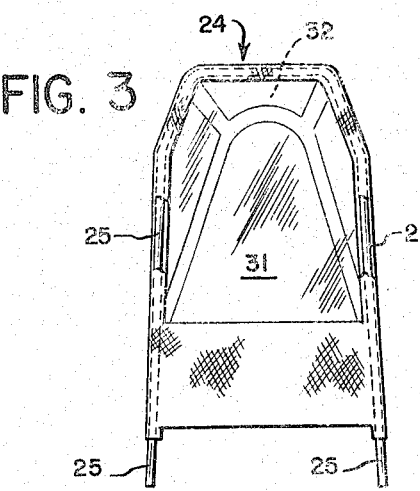
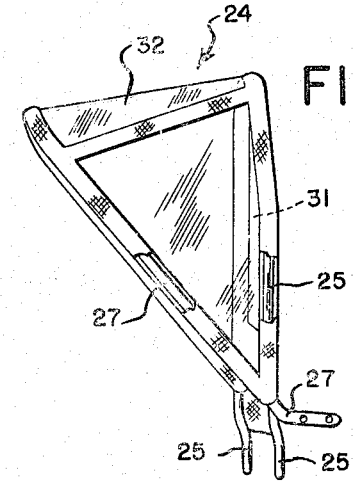
INVENTOR
James T. Hayden

3,301,589
PROTECTIVE MEANS FOR MOTORCYCLE DRIVER
James T. Hayden, 6745 Belkenton,
Cincinnati, Ohio 45236
Filed Jan. 21, 1965, Ser. No. 427,009
1 Claim. (Cl. 296—102)

This invention relates to motorcycles, and more specifically to protective means for the drivers of such vehicles by the use of which the utility of such vehicles can be greatly extended.

The term "motorcycle," as commonly used, embraces both a two-wheel variety and a three-wheel variety. The two-wheel motorcycle generally finds application where speed is the primary requirement of the vehicle. It finds wide application as a sporting vehicle, and also in police work. The three-wheel variety, on the other hand, is generally a working vehicle, and generally finds its principal use as an adjunct of business. The present invention will generally find application in three-wheel motorcycles.

A unique use for three-wheel motorcyles is in the delivery of automobiles, following service or repair of the automobile. To use it for this purpose, the motorcycle is hitched to the rear bumper of the automobile; the automobile driven by the operator to its destination; and the motorcycle there unhooked. The operator then rides the motorcycle back to his point of departure. Accomplishment of delivery of automobiles in this fashion by a single operator is obviously extremely desirable and not readily accomplished in any other fashion.

The three-wheel motorcycle is also frequently used by businessmen for making deliveries, particularly where small items are being delivered. These may be carried conveniently in the trunk which one commonly finds mounted at the rear of such motorcycles. Motorcycles as delivery vehicles offer a number of advantages over automobiles. Their economy of operation is contrasted to automobiles—economy in fuel consumption and also in maintenance is a primary one of such advantages. In addition to economy, another decided advantage is that these vehicles are compact and highly maneuverable. This advantage means that they may be parked in places where automobiles may not be left, and in crowded business districts motorcycles may be taken through traffic much more easily than can automobiles.

Despite these great advantages, such vehicles do not find as wide use as one might expect. A primary reason for this is that motorcycles are open to the weather. To maintain regular delivery schedules with such vehicles as now known might require unreasonable demands upon personnel to expose themselves to inclement weather. In the alternative, regular delivery schedules would have to be abandoned upon the advent of inclement weather. In any case, any use of such open vehicles in bad weather would meet with employee resistance.

There have been efforts over the years to cure this drawback, but the resulting structures have not made for a practical and generally useful vehicle, for the expedients heretofore devised while giving protection from the weather do so only at the expense of the convenience and efficiency which lead to the use of motorcycles in the first place. Hitherto known structural modifications offering protection from the weather utilize various flap and door expedients which impede ready access to the driver's seat of the motorcycle. Such expedients make the acts of mounting and dismounting from the motorcycle burdensome. Prior structures have been devised in the belief that total enclosure of the driver was necessary in order to offer any real weather protection. Considerable effort has been devoted to devising structures in which movement of the front windscreen as the vehicle is steered is possible, which structure is yet compatible with the presence of otherwise stationary protective enclosure elements. Undesirable structural complexity has resulted.

It is the primary object of this invention to provide protective means for the driver of a motorcycle which will shield him from wind, rain, and snow, and yet which will not substantially affect the convenience and efficiency which make the operation of such vehicles attractive. Modern motorcycles conventionally have a front windscreen which does protect the driver from wind effects which might interfere with the operation of the vehicle. My invention utilizes this windscreen as part of a combination which provides complete protection to the driver from the weather, and in addition captures engine heat, retaining it in the vicinity of the driver for his added comfort.

Another object herein is to provide driver protection means for motorcyclists by means of a structure which is sturdy and extremely simple structurally. Over-elaborate driver protective means may well be unable to withstand the stresses of wind and weather to which motorcycles are normally exposed in operation, and the solution of the present problem in the manner here provided is of considerable importance from the point of view of durability of the structure.

Still another object herein is to provide a protective device for motorcycle drivers which is economical in cost and easy to install and which, when necessary, may be readily replaced.

How these and many other objects are to be implemented will become clear through a consideration of the accompanying drawings wherein:

FIG. 1 is a side perspective view showing a three-wheel motorcycle in phantom upon which is mounted the novel combination of the present invention;

FIG. 2 is a side view of the canopy element, and

FIG. 3 is a back view of the canopy element of my novel structure.

Motorcycle 10 has a body or chassis 11. There is a driver's seat 12 mounted upon the body, and beneath the driver's seat is conventionally an engine 13 which powers the vehicle. Behind the driver's seat are mounted a pair of wheels 14 and 15, and between the wheels is commonly found a truck 16 within which may be placed articles for delivery.

Forwardly of the driver's seat is the front wheel 20 which is pivotably mounted to the body, and may be maneuvered for steering by means of handle bars 21. Steering post 22 interconnects wheel 20 and handle bars 21.

Windscreen 23 is mounted on the motorcycle above front wheel 20, and in front of handle bars 21. A driver, operating the vehicle, seated upon driver's seat 12, therefore will be protected from oncoming wind by means of such windscreen. The windscreen 23 is in part transparent to enable the driver to see his way.

Canopy 24 is situated behind and above the driver. The particular embodiment shown in the illustration is constructed of a first U-shaped framing member 25, which, as may be seen in the drawings, is rigidly secured to trunk 16 by means of conventional fasteners such as bolts at 26. Member 25 is substantially vertically disposed, and is located entirely behind the driver's seat 12, and therefore behind any driver who would be occupying the driver's seat. Second U-shaped member 27 is also rigidly affixed to trunk 16 by fastener means 28. Such second U-shaped member 27 inclines forwardly relative to the rear U-shaped member 25 as may be seen in the drawings.

Stretched over the two U-shaped members 25 and 27 is covering 30, which consists of a back panel portion 31 and hood portion 32. Hood portion 32 projects forwardly from back panel portion 31 with a maximum forward extent at the top of the canopy 24, the forward extent diminishing downwardly so that the hood portion 32 has its narrowest dimension toward the bottom of the canopy 24. Because of this construction, ready access to the driver's seat 12 is provided for an operator of the vehicle, and the operator may mount the motorcycle and dismount therefrom with a minimum of inconvenience.

As has been stated, hood portion 32 of canopy 24 has its maximum forward extent at the top of the canopy 24 as may best be seen in FIG. 1. The forward extent of the hood portion of the canopy stops short of reaching the windscreen, so that canopy 24 will not interfere with free movement of windscreen 23 upon steering of the motorcycle.

Hood portion 32 of the canopy 24, as may be seen in FIG. 1, is at approximately the same height as the top of the windscreen. I have found that it is preferable that the top of the hood not extend more than approximately an inch above the top of the windscreen, though, again to permit free movement of windscreen 23 upon steering of the vehicle, it is desirable that hood portion 32 of canopy 24 be somewhat above the level of the top of windscreen 23.

When my invention as above described is utilized, I have found that substantially complete weather protection to the operator of a motorcycle is made available, and I have found it unnecessary for the opeartor of a motorcycle to be completely enclosed in order to secure such protection. As the windscreen of the motorcycle breasts the wind, wind currents are created which sweep the wind, rain, or snow over the windscreen, over the top of the canopy, and rearwardly. The elements would strike the operator from behind, but for the presence of the back panel portion of the canopy. In addition to providing protection fom weather, the canopy of the present novel structure, serves to capture the rising heat from the engine, making the driver enclosure snug.

While I have descibed a specific embodiment of my invention, it is apparent that changes and modifications can be made therein, and, though changed or modified, the resulting structure may still fall within the ambit of my invention.

I claim:
A motorcycle comprising a body including an engine, a driver's seat, a pair of rear wheels, a trunk mounted between said wheels, and a front wheel and steering means pivotably attached to said body, a windscreen mounted forwardly of said steering means and extending upwardly above said front wheel to protect the torso of the driver, and a canopy comprising a first U-shaped frame member, substantially vertically disposed, mounted on opposite sides of said trunk behind the driver's seat, a second U-shaped frame member, inclining forwardly from the first, also mounted on opposite sides of said trunk behind the driver's seat, a covering for said U-shaped frame member to provide a back panel portion supported by said first member, and a hood portion supported between said first and second members, said hood portion extending from said back panel portion forwardly toward, but its forward extent being short of, said windscreen, the maximum dimension of forward extension of said hood portion being at the top of said canopy and above said driver's seat, the top of said canopy being at substantially the same height as the top of said windscreen, the dimension of forward extension of said hood portion decreasing from top to bottom thereof, said canopy being unattached to said windscreen.

References Cited by the Examiner

UNITED STATES PATENTS

| | | | |
|---|---|---|---|
| 2,783,056 | 2/1957 | Belk | 296—102 X |
| 2,921,799 | 1/1960 | Hatten | 296—102 X |

FOREIGN PATENTS

| | | |
|---|---|---|
| 1,116,771 | 5/1956 | France. |
| 1,175,543 | 5/1959 | France. |
| 220,532 | 8/1924 | Great Britain. |
| 443,935 | 1/1949 | Italy. |
| 508,960 | 1/1955 | Italy. |
| 581,891 | 1/1957 | Italy. |

BENJAMIN HERSH, *Primary Examiner.*

C. C. PARSONS, *Assistant Examiner.*